H. SEVERN.
Grain-Conveyer.
No. 162,955. Patented May 4, 1875.
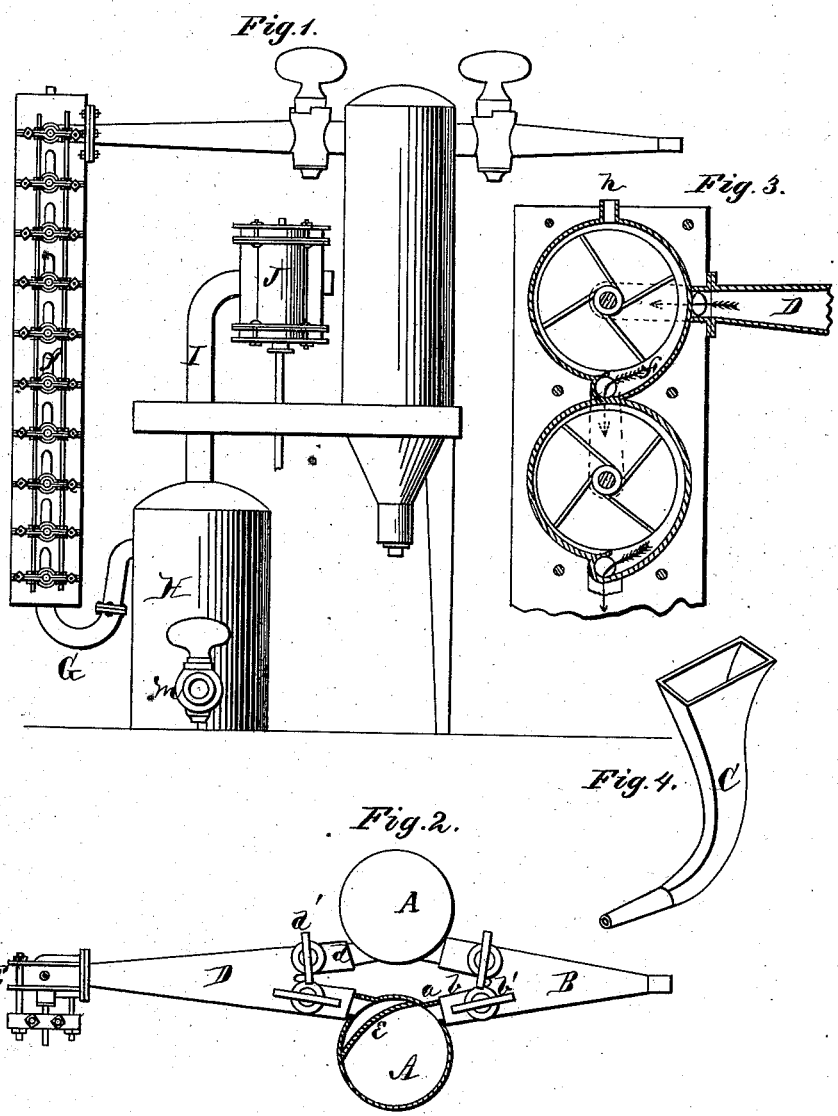

UNITED STATES PATENT OFFICE.

HENRY SEVERN, OF DAVENPORT, IOWA.

IMPROVEMENT IN GRAIN-CONVEYERS.

Specification forming part of Letters Patent No. 162,955, dated May 4, 1875; application filed April 13, 1875.

*To all whom it may concern:*

Be it known that I, HENRY SEVERN, of Davenport, in the county of Scott and in the State of Iowa, have invented certain new and useful Improvements in Grain - Conveyers; and do hereby declare that the following is a full, clear, and exact description thereof, reference being had to the accompanying drawings, and to the letters of reference marked thereon, making a part of this specification.

The nature of my invention consists in the construction and arrangement of a machine for conveying grain by means of suction produced by a series of pumps or fans, as will be hereinafter more fully set forth.

In order to enable others skilled in the art to which my invention appertains to make and use the same, I will now proceed to describe its construction and operation, referring to the annexed drawing, in which—

Figure 1 is a side elevation of my machine. Fig. 2 is a plan view of the same. Fig. 3 is an enlarged section of two of the air-sucking pumps or fans. Fig. 4 is a perspective view of the hopper, in which the grain is poured to be conveyed by my device.

A A represent two cylindrical grain-receivers of any suitable dimensions, having their lower ends hopper-shaped, and provided with suitable outlets. These receivers are by short pipes $a$ $a$ connected with branches $b$ $b$ of the grain-conveying pipe B. The pipe B may run any distance required, and at the point where the grain is to be admitted it is provided with a curved funnel, C. (Shown in Fig. 4.) The branches $b$ are provided with stop-cocks $b'$, so as to convey the grain into either of the receivers, as may be desired. Each receiver A is also, by a short pipe, $d$, connected with the pipe D leading to the pumps or fans E E, and said pipes $d$ are provided with stop-cocks $d'$. The pipes $a$ and $d$ enter the grain-receiver at the top, and between them in the receiver is a partition, $e$, to prevent the grain from being drawn through. The pumps used are simply ordinary suction-fans arranged in a series, and connected in the following manner: The pipe D enters the first pump or fan in the center, which pump communicates with the second pump at the center; also, by a passage, $f$, passing around a part of the first pump, and then vertically downward to the center of the second pump. All the pumps or fans in the series are connected in the same manner. From the last pump in the series a pipe, G, leads into a tank, H, and the top of this tank is, by a pipe, I, connected with an ordinary double - acting cylinder air - pump, J. The pumps or fans may be connected by cog-wheels or pulleys and belts, and operated by steam or any other suitable power.

The pumps or fans E being in operation, a vacuum is created, which will draw the grain through the conveying-tube B into either or both of the receivers A, where the grain falls down, while the air passing in with the grain goes around the lower edge of the air-breaker $e$ into the pipe D, through the fans or pumps E, and the pipe G into the tank H. The air thus being drawn through carries with it the dust from the grain, which passes through the fans. The air and dust are moistened by a small continuous stream of water admitted into the top pump of the series through an inlet-pipe, $h$, as shown in Fig. 3. The water, dust, and air then pass together through all the pumps, and through the pipe G into the tank H, where the water and dust are collected, and may be drawn off through a faucet, $m$, while the air is pumped out by the air-pump J.

The current through the grain-conveyer may be made stronger or weaker, as required, by the employment of a greater or less number of pumps.

When the receivers are filled with grain the pumps are stopped, and the grain may be emptied as required.

This device may be employed for conveying grain great distances, and, if necessary, relays may be established at suitable intervals.

By the admission of water into the fans the air is weighted, causing the pumps or fans to operate to better advantage, as well as moistening the dust to convey it into the tank.

Having thus fully described my invention, what I claim as new, and desire to secure by Letters Patent, is—

1. The combination, with a grain-conveying pipe, D, of a series of suction fans or pumps, E E, for creating a vacuum in said pipe, and by suction draw the grain through the same into receivers properly arranged, substantially as herein set forth.

2. The combination of the air-conveying pipe B, receivers A A, provided with air-breakers $e\ e$, the pipe D, and the series of suction fans or pumps E E, substantially as and for the purposes herein set forth.

3. A series of suction fans or pumps, E E, arranged to communicate from the circumference of one to the center of the next fan or pump, in combination with a grain-conveying pipe, substantially as herein set forth.

4. The combination, with the suction fans or pumps E, of the pipe G, tank H, pipe I, and air-pump J, substantially as and for the purposes herein set forth.

5. In a grain-conveyer, a continuous stream or current of water passing with the air through a series of suction fans or pumps, for the purposes herein set forth.

In testimony that I claim the foregoing I have hereunto set my hand this 10th day of April, 1875.

HENRY SEVERN.

Witnesses:
 WILLIAM L. BRAMHALL,
 C. M. BART.